(12) United States Patent
Karogal et al.

(10) Patent No.: US 7,989,732 B2
(45) Date of Patent: Aug. 2, 2011

(54) METHOD OF AC WELDING USING A FLUX CORED ELECTRODE

(75) Inventors: Nikhil Karogal, Cleveland, OH (US); Rajeev Katiyar, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 984 days.

(21) Appl. No.: 11/152,617

(22) Filed: Jun. 15, 2005

(65) Prior Publication Data
US 2006/0283848 A1    Dec. 21, 2006

(51) Int. Cl.
*B23K 9/09* (2006.01)
*B23K 35/36* (2006.01)

(52) U.S. Cl. .......... 219/137 PS; 219/130.51; 219/130.1; 219/145.22; 219/146.23; 219/137 WM

(58) Field of Classification Search ............. 219/145.22, 219/137.2, 146.23, 137 MW, 130.1, 130.5, 219/130.51
See application file for complete search history.

(56) References Cited

U.S. PATENT DOCUMENTS

| | | | |
|---|---|---|---|
| 1,888,453 A | 11/1932 | De Pape | |
| 3,424,892 A | 1/1969 | Wilcox | |
| 3,539,765 A | 11/1970 | Duttera et al. | |
| 3,560,702 A | 2/1971 | Arikawa | |
| 3,573,426 A | 4/1971 | Blake | |
| 3,776,589 A | 12/1973 | Smith et al. | |
| 3,787,658 A | 1/1974 | Kammer et al. | |
| 3,848,109 A * | 11/1974 | Zvanut ..................... | 219/146.41 |
| 4,020,320 A | 4/1977 | Pijls | |
| 4,072,845 A | 2/1978 | Buckingham et al. | |
| 4,131,784 A | 12/1978 | Kimura et al. | |
| 4,186,293 A | 1/1980 | Gonzalez et al. | |
| 4,246,463 A | 1/1981 | Shutt et al. | |
| 4,319,124 A | 3/1982 | Johansson | |
| 4,355,054 A * | 10/1982 | Nagano et al. .................. | 427/61 |
| 4,355,224 A | 10/1982 | Mesick et al. | |
| 4,427,874 A | 1/1984 | Tabata | |
| 4,551,610 A | 11/1985 | Amata | |
| 4,683,011 A | 7/1987 | Weaver et al. | |
| 4,717,536 A | 1/1988 | Chai et al. | |
| 4,717,807 A | 1/1988 | Parks et al. | |
| 4,723,061 A | 2/1988 | Munz et al. | |

(Continued)

FOREIGN PATENT DOCUMENTS
EP    103 6637    9/2000

(Continued)

OTHER PUBLICATIONS

XP 001028478.

(Continued)

*Primary Examiner* — Stephen Ralis
(74) *Attorney, Agent, or Firm* — Hahn Loeser & Parks LLP

(57) ABSTRACT

A method of AC welding that includes the step of supplying AC current with a given waveform from a power source to an advancing electrode and workpiece. The AC current is used to melt the electrode and to thereby deposit metal from the electrode onto the workpiece. The electrode includes a particulate arc stabilizing compound. The particulate arc stabilizing compound includes sodium and titanium dioxide. The particulate arc stabilizing compound constitutes over 20% by weight of the core of the electrode.

38 Claims, 3 Drawing Sheets

U.S. PATENT DOCUMENTS

| | | | |
|---|---|---|---|
| 4,794,232 A | 12/1988 | Kimbrough | |
| 4,833,296 A | 5/1989 | Crockett et al. | |
| 4,948,936 A * | 8/1990 | Landry | 219/76.14 |
| 4,954,961 A | 9/1990 | Parks et al. | |
| 5,003,155 A | 3/1991 | Chai et al. | |
| 5,015,823 A | 5/1991 | Crockett et al. | |
| 5,055,655 A | 10/1991 | Chai et al. | |
| 5,091,628 A | 2/1992 | Chai et al. | |
| 5,120,931 A | 6/1992 | Kotecki et al. | |
| 5,132,514 A | 7/1992 | Chai et al. | |
| 5,220,151 A | 6/1993 | Terayama et al. | |
| 5,220,551 A | 6/1993 | Tatkishi et al. | |
| 5,225,660 A | 7/1993 | Mita et al. | |
| 5,225,661 A | 7/1993 | Chai et al. | |
| 5,233,160 A | 8/1993 | Gordish et al. | |
| 5,278,390 A | 1/1994 | Blankenship | |
| 5,349,159 A | 9/1994 | Mita et al. | |
| 5,365,036 A | 11/1994 | Crockett et al. | |
| 5,369,244 A | 11/1994 | Kulikowski et al. | |
| 5,676,857 A | 10/1997 | Parker | |
| 5,742,029 A | 4/1998 | Stava et al. | |
| 5,961,863 A | 10/1999 | Stava et al. | |
| 5,981,906 A | 11/1999 | Parker | |
| 5,990,445 A | 11/1999 | Ogasawara | |
| 6,051,810 A | 4/2000 | Stava et al. | |
| 6,091,048 A | 7/2000 | Lanouette | |
| 6,093,906 A | 7/2000 | Nicholson | |
| 6,111,216 A | 8/2000 | Stava | |
| 6,160,241 A | 12/2000 | Stava | |
| 6,172,333 B1 | 1/2001 | Stava | |
| 6,204,478 B1 | 3/2001 | Nicholson | |
| 6,207,927 B1 * | 3/2001 | Mita et al. | 219/130.51 |
| 6,207,929 B1 | 3/2001 | Stava | |
| 6,215,100 B1 | 4/2001 | Stava et al. | |
| 6,291,798 B1 | 9/2001 | Stava et al. | |
| 6,339,209 B1 | 1/2002 | Kotecki | |
| 6,472,634 B1 | 10/2002 | Houston et al. | |
| 6,501,049 B2 | 12/2002 | Stava | |
| 6,515,259 B1 | 2/2003 | Hsu | |
| 6,617,549 B2 | 9/2003 | Ihde | |
| 6,717,107 B1 | 4/2004 | Hsu | |
| 6,723,954 B2 | 4/2004 | Nikodym | |
| 6,723,957 B2 | 4/2004 | Holverson | |
| 6,784,401 B2 | 8/2004 | North et al. | |
| 6,855,913 B2 | 2/2005 | Nikodym | |
| 7,053,334 B2 | 5/2006 | Stava | |
| 7,145,101 B2 | 12/2006 | Tong | |
| 2002/0030043 A1 | 3/2002 | Tong | |
| 2003/0094444 A1 * | 5/2003 | Kato et al. | 219/145.22 |
| 2003/0116548 A1 | 6/2003 | Blankenship | |
| 2004/0188407 A1 | 9/2004 | Nikodym | |
| 2005/0006367 A1 * | 1/2005 | Dodge et al. | 219/130.1 |
| 2005/0051524 A1 | 3/2005 | Blankenship | |
| 2005/0121110 A1 * | 6/2005 | Dallam et al. | 148/23 |
| 2005/0127054 A1 | 6/2005 | Houston et al. | |
| 2006/0219684 A1 * | 10/2006 | Katiyar | 219/145.22 |
| 2006/0226131 A1 | 10/2006 | Stava | |

FOREIGN PATENT DOCUMENTS

| | | |
|---|---|---|
| EP | 1595634 | 11/2005 |
| FR | 2 177 134 | 11/1973 |
| JP | 53-67657 | 6/1978 |
| JP | 9-38772 | 2/1997 |
| SU | 1826338 | 8/1996 |
| WO | WO 0197963 A2 * | 12/2001 |

OTHER PUBLICATIONS

XP 002390155.
U.S. Appl. No. 11/099,267, filed Apr. 5, 2005, Katiyar.
European Search Report dated Jun. 13, 2007.

* cited by examiner

METHOD OF AC WELDING USING A FLUX CORED ELECTRODE

The present invention relates to the art of electric arc welding and more particularly to an improved AC FCAW welding method employing a novel flux cored electrode.

INCORPORATION BY REFERENCE

The invention relates to electric arc welding with an AC welding process. Many patents over the years relate to AC MIG and/or AC FCAW welding; however, Stava U.S. Pat. No. 6,111,216 is incorporated by reference herein as general background information since it discloses an inverter based AC MIG welder used to practice for either AC MIG welding or the preferred embodiment of the invention for AC FCAW welding. Furthermore, the Stava patent uses a system where the current is lowered during the polarity reversing. The invention involves an additive to a flux cored electrode for enhancing AC MIG welding with a flux cored electrode. This AC MIG welding with a cored electrode is referred to as FCAW. If the core of the electrode is metal only, then the welding is generally referred to as GMAW-C. A combination of graphite and potassium for arc stability is disclosed in Nikodym U.S. Pat. No. 6,855,913. This compound is used for early AC welding processes where a transformer based power source supplies a limited wave form having low frequency and a low voltage during zero crossing. For mere background regarding the advantage of AC welding with a solid or cored wire and a disclosure of an arc stabilizer for an early type of AC waveform, this patent is incorporated by reference herein. Nikodym does not explain why it is advantageous to use a potassium compound for arc stability. The additive to which the present invention is directed is a grafted compound formed in advance, not just mixed into the other granules of the core. This grafted compound is disclosed in assignee's prior pending application Ser. No. 11/099,267, filed Apr. 5, 2005. This is not prior art, but is incorporated by reference to disclose the novel grafted compound used in practicing the present invention.

THE INVENTION

To obtain high deposition rates with high travel speed for a flux cored electrode while obtaining reduced moisture pick-up properties and excellent weld bead profile with reduced diffusible hydrogen, it has been found that a sodium-silicon-titanium compound added to the core of a flux cored electrode is quite beneficial. It has also been found that such additive to the core material of the flux cored electrode increased arc stability for the DC welding as normally employed with flux cored electrodes. In the past, flux cored electrodes developed for normal DC positive welding have not exhibited good arc stability when used for AC welding. This was especially true when using a common transformer based power source to obtain the AC waveform. Such power source produces a sine wave having a very low voltage during zero crossing of the waveform. This type of early power source employed arc stability additives, such as sodium and potassium compounds to address the tendency of the arc to be extinguished during polarity changes. With the advent of inverter based power sources, arc reversal is accomplished at high voltage and high current with a very short time. This reduces the tendency of the arc to extinguish; however, it presents further problems of arc stability during the polarity reversal. When reversing polarity at high voltages, i.e. greater than about 20 volts, and at high currents, normally above 500 amps, the plasma column constituting the welding arc does not tend to extinguish. Consequently, the stability of the arc during reversal is necessary to maintain bead appearance and reduced spatter caused by the massive energy charged caused by rapid reversal of current flow. There is a need for providing an arc stability constituent in the core of a flux cored electrode so that flux cored electrode could be used in AC welding, both in early and somewhat superceded sinusoidal type power source, as well as the inverter based power source having rapid transition between polarities. It has been found that a compound grafting sodium and possibly some potassium with titanium dioxide results in the arc stability for an inverter based AC arc welding so that the compound provides arc stability, as well as increased mechanical properties of the weld bead. By a compound grafting titanium and sodium, it has been found that the stability of the arc during welding, especially on inverter based power sources, is enhanced. The mechanical properties of the resulting weld bead are also increased. These features allow the use of flux cored electrodes for the inverter based power sources when operated in an AC mode to thereby produce high deposition rates and high electrode travel speed. The arc stability characteristic of the novel compound disclosed in prior application Ser. No. 11/099,267 filed Apr. 5, 2005 is used to produce an improved AC arc welding method which method constitutes the present invention.

In accordance with the present invention there is provided a method of AC welding with a special cored electrode. The method comprises feeding the novel electrode toward a workpiece, wherein the electrode has a particulate core surrounded by a low carbon steel sheath. A power source supplies an AC current with a given waveform between the advancing electrode and the workpiece to melt the electrode and deposit metal from the electrode onto the workpiece by performing a selected AC welding process. In the preferred embodiment of the invention, the power source is an inverter based power source with an output polarity switching network to shift between positive polarity and negative polarity to create the selected AC welding process; however, the invention is also applicable to the early transformer based power sources, employing merely a sinusoidal welding waveform. The method of the invention also involves passing a shielding gas around the advancing electrode and providing the core of the electrode with a particulate arc stabilizing additive in the form of a grafted compound of sodium and titanium dioxide comprising over 20% by weight of the core. Preferably a rutile based slag system is used in the core of the electrode. In the invention, the grafted arc stabilizing compound is sodium-silico-titanate in granular form.

In a preferred embodiment of the invention, the method involves an inverter based power source that outputs an AC waveform with a profile dictated by a waveform generator controlling a pulse width modulator operated at a frequency of over about 18 kHz. This type power source is the more advanced technology for electric arc welding and the method is primarily designed for such a welding procedure; however, it is also advantageous used with an early transformer based power source.

In accordance with another aspect of the invention, the selected AC welding process alternates between a positive voltage and a negative voltage, wherein each voltage is greater than 20 volts. Furthermore, the reversal of polarity in the selected welding process is at current less than about 500 amperes and is preferably less than 200 amperes.

The primary object of the present invention is the provision of a method of AC welding with a flux cored electrode (FCAW), which method utilizes a grafted arc stabilizing compound in the fill of the electrode, which compound is a blend of a sodium compound and titanium dioxide. Preferably, the grafted arc stabilizing compound is sodium-silico-titanate.

Yet another object of the present invention is the provision of an AC welding method using a flux cored electrode (FCAW), which method has an increased deposition rate, increased travel time and a controlled plasma column during polarity reversal to maintain a good bead appearance and reduced spatter.

These and other objects and advantages will become apparent from the following description taken together with the accompanying drawings.

DESCRIPTION OF THE INVENTION

Figure 1:
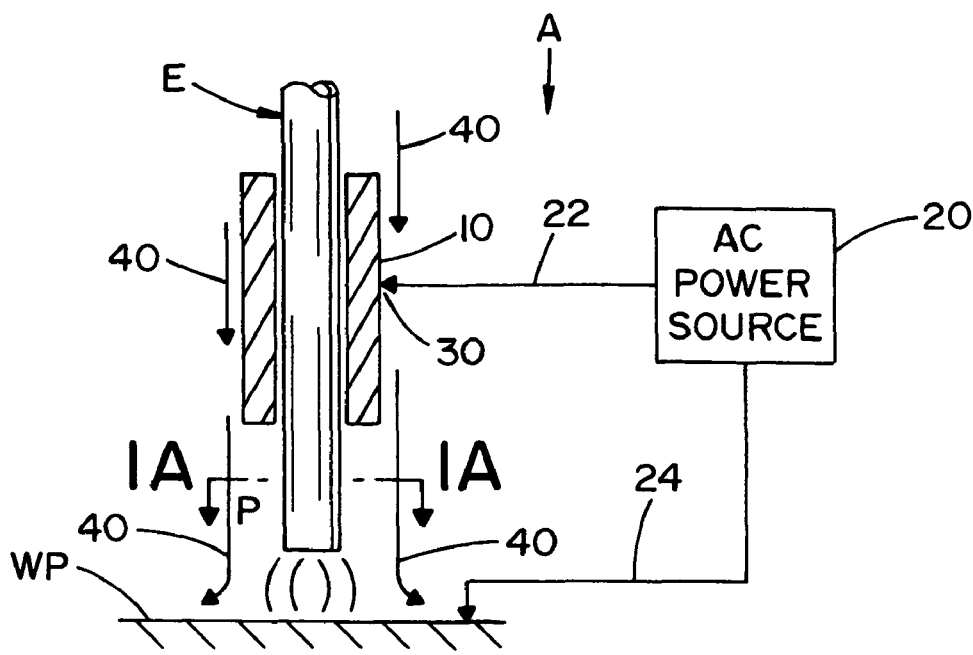
FIG. 1 is an enlarged cross sectional view illustrating an AC welding apparatus to perform the welding method of the present invention.
Figure 1A:
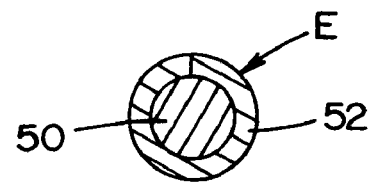
FIG. 1A is a cross-sectional view taken generally along line 1A-1A of FIG. 1.

To increase the deposition rate and travel speed for GMAW welding, it has become known that flux cored electrode offers substantial advantages; however, flux cored electrode has normally been used in DC positive welding to stabilize the arc and reduce spatter. To obtain the advantages of AC welding, while still employing a flux cored electrode, the core material has required modification to reduce spatter and stabilize the arc during the zero crossing. The present invention relates to a flux cored electrode as used in DC welding, which electrode incorporates the necessary alloying system, a flux system with moisture control, hydrogen control constituents, oxygen control constituents and bead profile control elements, while still maintaining good physical characteristics of the bead and arc stability. The method of the present invention is schematically illustrated in FIG. 1. Welding apparatus A utilizes a novel flux cored electrode, or wire, E for welding between the electrode and workpiece WP. In such an apparatus, flux cored electrode advances downwardly through contact tip 10 so AC power source 20, preferably of the type shown in FIG. 4, produces a voltage and current at power lead 22 and ground lead 24. A shielding gas 40 is passed around the advancing flux coded electrode. The power lead is attached to contact tip 10 by connector 30 to direct the voltage and current between advancing electrode E and workpiece WP to create the arc welding plasma P for a selected AC welding process determined by control of the power source 20. The invention uses a special electrode E of the flux cored type schematically illustrated in FIG. 1A wherein a particulate fill material 50 is surrounded by a low carbon steel sheath 52 for retaining the core material until the core material is melted with sheath 52.

Figure 2:
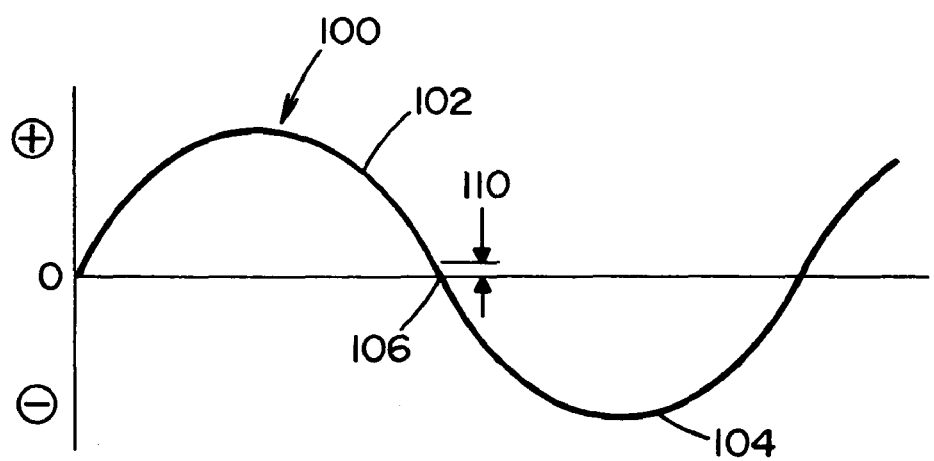
FIG. 2 is a current graph of the sinusoidal waveform used in AC welding with power source based upon a transformer.

The particulate material in core 50 has a flux system, preferably a rutile system, and constituents for moisture control, hydrogen control, oxygen control and bead profile control, while maintaining arc stability during transition between positive and negative polarities. A common AC waveform is shown in FIG. 2 wherein positive portion 102 and a negative portion 104 are transitioned at zero crossing 106. Zero crossing occurs at low voltage and low current represented by distance 110. The low voltage and low current deleteriously affects arc stability, which is overcome in the present invention by a novel grafted compound used in the particulate material of core 50.

A general formulation of the fill composition (weight percent of core 50) in accordance with the present invention is set forth as follows:

| | |
|---|---|
| $TiO_2$ | 2-50% |
| Sodium-silico-titanate compound | 1-55% |
| Slag forming Agent | 1-60% |
| Metal Alloying Agent | 0-70% |

In another more specific general formulation of the fill, composition (weight percent

| | |
|---|---|
| $TiO_2$ | 3-40% |
| Sodium-silico-titanate compound | 1-55% |
| Slag forming Agent | 20-50% |
| Metal Alloying Agent | 0-55% |

In another more specific general formulation of the fill composition (weight percent):

| | |
|---|---|
| $TiO_2$ | 20-40% |
| Sodium-silico-titanate compound | 20-50% |
| Slag forming Agent | 25-45% |
| Metal Alloying Agent | 0-35% |

In still another more specific general formulation of the fill composition (weight percent):

| | |
|---|---|
| $TiO_2$ | 3-15% |
| Sodium-silico-titanate compound | 15-25% |
| Slag forming Agent | 30-40% |
| Metal Alloying Agent | 35-45% |

In yet another more specific general formulation of the fill composition (weight percent):

| | |
|---|---|
| $TiO_2$ | 20-30% |
| Sodium-silico-titanate compound | 1-5% |
| Slag forming Agent | 20-30% |
| Metal Alloying Agent | 45-55% |

In the above examples, the weight percent of the fill composition is typically about 8-60 weight percent of the cored electrode, and more typically about 10-28 weight percent of the cored electrode; however, other weight percentages can be used. The metal sheath that can be used to form the weld bead can include about 0-0.2 weight percent B, about 0-0.2 weight percent C, about 0-12 weight percent Cr, about 0-5 weight percent Mn, about 0-2 weight percent Mo, less than about 0.01% N, about 0-5 weight percent Ni, less than about 0.014% P, about 0-4 weight percent Si, less than about 0.02% S, about 0-0.4 weight percent Ti, about 0-0.4 weight percent V and about 75-99.9 weight percent Fe. During an arc welding process, a shielding gas is typically used with the cored electrode; however, this is not required. When a shielding gas is used, the shielding can is typically a carbon dioxide and argon blend.

The slag forming agent typically includes, but is not limited to, metal oxides such as aluminum oxide, boron oxide, calcium oxide, chromium oxide, iron oxide, magnesium oxide, niobium oxide, potassium oxide, silicon dioxide, sodium oxide, tin oxide, vanadium oxide and/or zirconium oxide. The metal alloying agent, when used, typically includes, but is not limited to, aluminum, boron, calcium, carbon, iron, manganese, nickel, silicon, titanium and/or zirconium. The flux system can include other compounds such as, but not limited to, metal carbonates (e.g., calcium carbonate, etc.) and/or metal fluorides (e.g., barium fluoride, bismuth fluoride, calcium fluoride, potassium fluoride, sodium fluoride, Teflon, etc.). The particular components of the flux system typically depend on the type of welding process (SAW, GMAW, FCAW) to be used and/or the type of workpiece to be welded. Preferably the slag system is rutile based.

The sodium-silico-titanate compound is specifically formulated to provide arc stability and to reduce moisture pick-up of the flux system. The sodium-silico-titanate compound typically includes titanium dioxide, potassium silicate, sodium silicate and colloidal silica. The titanium dioxide content of the sodium-silico-titanate compound typically is a majority weight percent. The weight percent ratio of the sodium silicate to potassium silicate is generally about 1.5-3.5:1, and more typically about 1.75-2.5:1. Typically, a majority of the silicon dioxide that forms the colloidal silica is from a pure source. Typically the particles of silica have an average particle size of about 2-25 nanometers, and more typically an average particle size of about 6-12 nanometers. The sodium-silico-titanate compound can include other sodium compounds such as, but not limited to sodium carbonate. These sodium compounds can be used to provide arc stability and/or gas shielding during the welding process. The sodium-silico-titanate compound can also include other components such as water, lithium compounds, sulfur, carbon, etc.; however, this is not required. These other components, when included in the sodium-silico-titanate compound typically constitute less than about 10 weight percent of the sodium-silico-titanate compound.

The sodium-silico-titanate compound is typically formed by mixing the solution of colloidal silica with the titanium oxide (e.g., rutile), the silicates, and any other components of sodium-silico-titanate compound. After the components of the sodium-silico-titanate compound have been properly mixed together, the sodium-silico-titanate compound is dried to remove the water from the sodium-silico-titanate compound. After the sodium-silico-titanate compound has been dried, the water content of the sodium-silico-titanate compound is generally less than about 0.1 weight percent, typically less than about 0.08 weight percent, and more typically less than about 0.06 weight percent. After the sodium-silico-titanate compound has been dried, the sodium-silico-titanate compound is typically sized. This sizing process is typically performed by a grinding and screening operation; however, other or additional sizing processes can be used. The average particle size of the sodium-silico-titanate compound after sizing is typically less than 40 mesh and more typically about 50-200 mesh.

Examples of the sodium-silico-titanate compound are set forth below (weight percent of sodium-silico-titanate compound):

Example 1

| | |
|---|---|
| $TiO_2$ | 60-90% |
| Sodium silicate | 1-20% |
| Potassium silicate | 1-15% |
| Sodium compound | 1-20% |
| Colloidal Silica | 1-10% |
| Other components | 0-5% |

Example 2

| | |
|---|---|
| $TiO_2$ | 70-90% |
| Sodium silicate | 4-15% |
| Potassium silicate | 1-10% |
| Sodium carbonate | 3-16% |
| Colloidal Silica | 2-6% |
| Other components | 0-1% |

Example 3

| | |
|---|---|
| $TiO_2$ | 70-80% |
| Sodium silicate | 3.5-10% |
| Potassium silicate | 1.5-6% |
| Sodium carbonate | 5-15% |
| Colloidal Silica | 2-5% |
| Other components | 0-0.5% |

Figure 3:
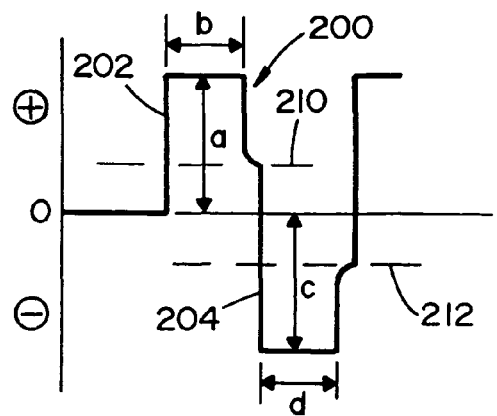
FIG. 3 is a current waveform of an AC MIG welding process utilizing a power source based upon an inverter with an output polarity reversal switching network, as shown in Stava U.S. Pat. No. 6,111,216.

Novel flux cored electrode E utilizes sodium-silico-titanate to reduce the moisture pick-up properties of the core material during manufacturing. It also has proven to be an effective arc stabilizing substance when using the flux cored electrode in DC positive welding, as is common practice. It has been found that this particular compound when added to core 50 of electrode E also produces arc stability allowing the electrode to be used in an AC welding. This characteristic is used to practice the present invention. The grafted substance has proven beneficial as an arc stabilizer for a sinusoidal waveform 100, as shown in FIG. 2. It has also proven beneficial to stabilize the plasma column P when reversal of polarity is at a high voltage and high current, as is experienced in using generally rectangular type waveform, such as waveform 200 shown in FIG. 3. Waveform 200 is shown modified to reduce the current before there is polarity reversal. This is a feature described in Stava U.S. Pat. No. 6,111,216.

Waveform 200 includes positive portion 202 with amplitude a and width b and negative portion 204 with amplitude c and width d. In practice, the amplitudes a, c are not always equal. They are adjusted according to the desired amount of heat and workpiece cleaning action of the AC welding process. In practice, the amplitudes are 600-1000 amperes. To avoid polarity reversal at high currents the current is allowed to decay toward lines 210, 212 before actual reversal of polarity. In this manner, even though the amplitudes are quite high the current reversal is at a lower voltage. This is preferred; however, in practice, the reversal is generally in the range of 200-300 amperes while the voltage is retained at a high level such as 20 volts. The voltage curve for developing waveform 200 is not illustrated; however, the maximum is greater than 200 volts. The high current and high voltage make the plasma column somewhat erratic and affects bead appearance. This is overcome by using electrode E.

Figure 4:
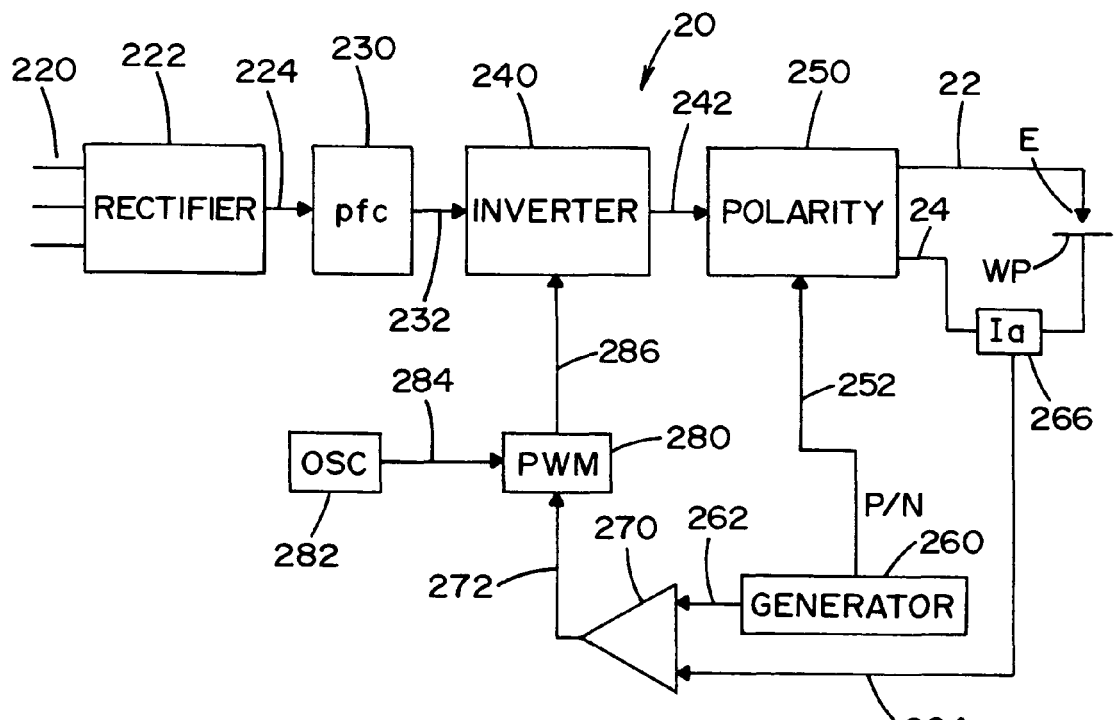
FIG. 4 is a block diagram showing schematically the power source and welding operation to create the current waveform illustrated in FIG. 3; and, FIG. 5 is a flow chart illustrating generally the manufacturing procedure for making the novel sodium and titanium dioxide compound for use in the method of the present invention.

Waveform 200 has become a somewhat standard AC welding waveform employed at the welding operation between electrode E and workpiece WP when power source 20 is an inverter based power source schematically illustrated in the block diagram of FIG. 4. Power source 20 is driven by line voltage input 220 through rectifier 222 having an output DC signal on line 224. This signal is changed by boost converter 230 having a power factor correcting chip so the input power factor is corrected. The output voltage on line 232 is a DC voltage directed to the input of inverter 240. The inverter is a high switching speed inverter of standard construction with the output 242 of the inverter is directed to polarity switching network 250 to control the polarity between leads 22, 24 in accordance with logic on line 252. To generate waveform 200 power source 20 includes a waveform generator or wave shaper 260 having output line 262 to control the profile of waveform 200 at any given time. The polarity of the waveform is controlled by the logic on line 252. The signal on profile output line 262 is compared with the actual arc current on line 264 from shunt 266 so amplifier 270 has a voltage on output 272 to control pulse width modulator 280 driven by oscillator 282 operated at a frequency greater than 18 kHz and, preferably, greater than 20-50 kHz. Oscillator 282 creates pulses on line 284 to drive pulse width modulator 280 in accordance with the voltage on line 272 so output line 286 controls the profile of waveform 200. Polarity reversal is accomplished by the logic on line 252 using polarity switching network 250. Thus, the novel AC MIG welding method of the present invention utilizes flux cored electrode E in either an inverter based power source, as shown in FIG. 4, or a less sophisticated transformer based power source, as schematically represented by waveform 100 in FIG. 2. In either AC welding method, the arc plasma is stabilized to prevent spatter and maintain excellent weld bead profile as well as good mechanical properties.

Figure 5:
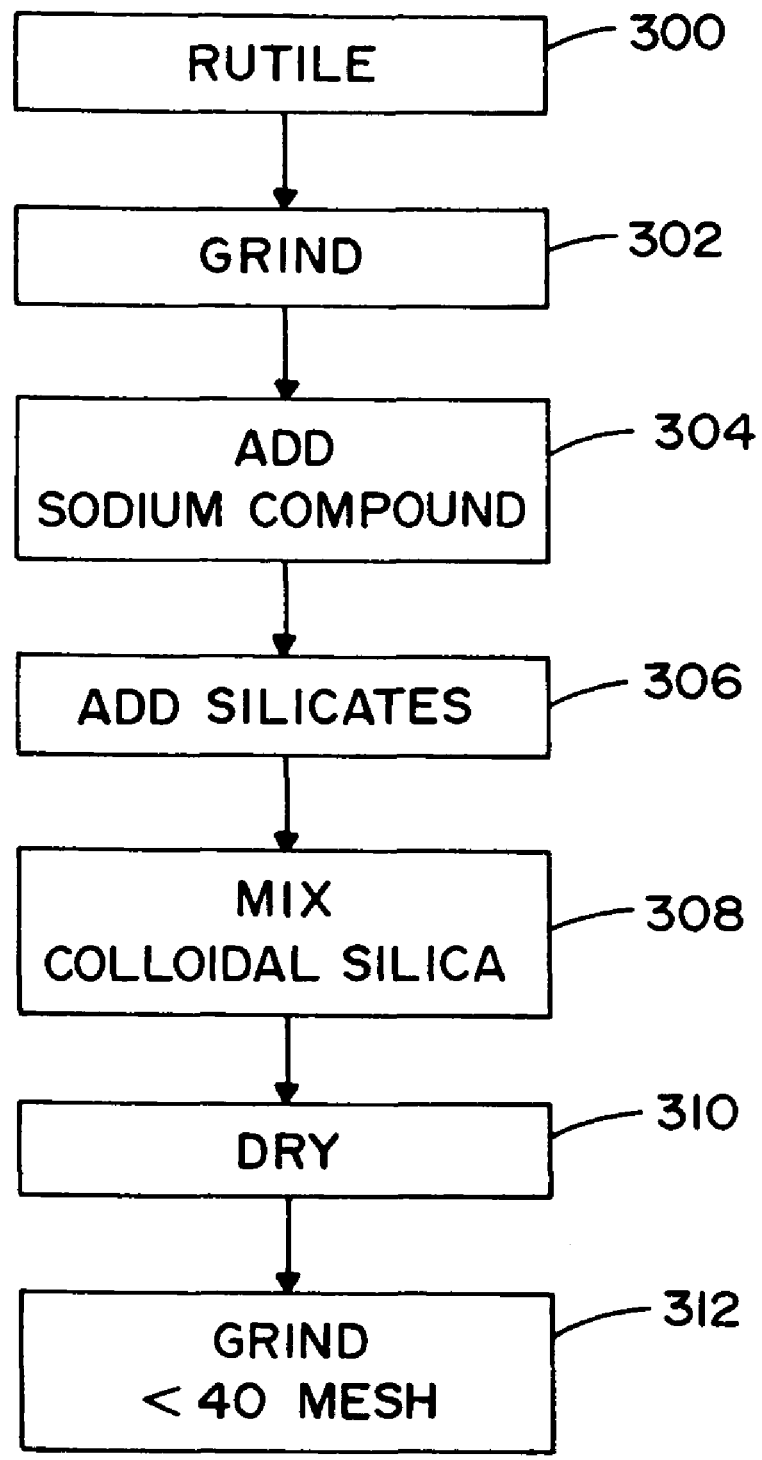

To produce the arc stabilizing compound used in the method of the present invention, the procedure of FIG. 5 is generally employed to graft sodium and titanium dioxide. Titanium dioxide, or rutile, is provided as indicated by step 300. The rutile is ground into a size less than about 50 mesh as indicated by step 302. To the granular rutile is added the sodium compound indicated by step 304 and the silicates, primarily sodium silicate, as indicated by step 306. The granular commingled mass is then mixed with colloidal silica, as indicated by step 308. This resulting mixture is then dried, as indicated by step 310, and ground to a size less than 40 mesh, but preferably less than 50 mesh. Grinding step 312 can also include a grading step to eliminate any particles less than about 200 mesh. The resulting compound is a particulate material that is added to the core 50 of electrode E during the standard manufacturing process for electrode E.

The present invention is a method of AC welding process using a novel flux cored electrode (FCAW) having a grafted compound of sodium and titanium. The AC welding can be with a gas (FCAW-G), like MIG welding, or with self shielding (FCAW-S). This grafted compound is novel and allows the use of electrode E to produce a stable welding process with excellent bead and physical characteristics. The compound stabilizes the plasma column during polarity reversal in an AC MIG welding process.

Having thus defined the invention, the following is claimed:

1. A method of AC welding involving polarity reversal and a plasma column during welding, said method comprising:
   (a) preparing a particulate arc stabilizing compound by
      mixing an aqueous solution of a colloidal silica with a first titanium dioxide and a sodium silicate and a potassium silicate to form a sodium-silico-titanate solution, a ratio of said sodium silicate to said potassium silicate ranging from between 1.5/1 to 3.5/1,
      drying said solution to remove water so that said sodium-silico-titanate solution is a dehydrated sodium-silico-titanate compound having less than about 0.1 weight percent water,
      sizing said dehydrated sodium-silico-titanate compound so that an average particle size of said dehydrated sodium-silico-titanate compound is less than 40 mesh;
   (b) preparing a core material by combining said dehydrated sodium-silico-titanate compound with a second titanium dioxide;
   (c) forming a cored electrode by placing said core material into a steel sheath;
   (d) feeding said cored electrode toward a workpiece;
   (e) supplying AC current from a power source to said cored electrode to cause at least a portion of said electrode to melt and deposit metal from said electrode onto the workpiece, said AC current having a given waveform;
   (f) supplying a shielding gas, said shielding gas at least partially surrounding said advancing electrode; and
   (g) said addition of said dehydrated sodium-silico-titanate compound stabilizing said plasma column during polarity reversal in said method compared to said plasma column without said addition of said sodium-silico-titanate compound.

2. The method as defined in claim 1, wherein said percentage of said particulate arc stabilizing compound is over about 20% by weight of said core material.

3. The method as defined in claim 1, wherein said percentage of said particulate arc stabilizing compound is up to about 50% by weight of said core material.

4. The method as defined in claim 1, wherein said core material comprises by weight percent:

| | |
|---|---|
| TiO$_2$ | 2-50% |
| Sodium-silico-titanate compound | 1-55% |
| Slag forming Agent | 1-60% |
| Metal Alloying Agent | 0-70%. |

5. The method as defined in claim 1, wherein said core material comprises by weight percent:

| | |
|---|---|
| TiO$_2$ | 3-40% |
| Sodium-silico-titanate compound | 1-55% |
| Slag forming Agent | 20-50% |
| Metal Alloying Agent | 0-55%. |

6. The method as defined in claim 1, wherein said core material comprises by weight percent:

| | |
|---|---|
| TiO$_2$ | 20-40% |
| Sodium-silico-titanate compound | 20-50% |
| Slag forming Agent | 25-45% |
| Metal Alloying Agent | 0-35%. |

7. The method as defined in claim 1, wherein said core material comprises by weight percent:

| | |
|---|---|
| TiO$_2$ | 3-15% |
| Sodium-silico-titanate compound | 15-25% |
| Slag forming Agent | 30-40% |
| Metal Alloying Agent | 35-45%. |

8. The method as defined in claim 1, wherein said core material comprises by weight percent:

| | |
|---|---|
| TiO$_2$ | 20-30% |
| Sodium-silico-titanate compound | 1-5% |
| Slag forming Agent | 20-30% |
| Metal Alloying Agent | 45-55%. |

9. The method as defined in claim 1, wherein said particulate arc stabilizing compound in said core includes by weight percent:

| | |
|---|---|
| TiO$_2$ | 60-90% |
| Sodium silicate | 1-20% |
| Potassium silicate | 1-15% |
| Sodium compound | 1-20% |
| Colloidal silica | 1-10% |
| Other compounds | 0-5%. |

10. The method as defined in claim 1, wherein said particulate arc stabilizing compound in said core includes by weight percent:

| | |
|---|---|
| TiO$_2$ | 70-80% |
| Sodium silicate | 3.5-10% |
| Potassium silicate | 1.5-6% |
| Sodium carbonate | 5-15% |
| Colloidal silicate | 2-5% |
| Other compounds | 0-0.5%. |

11. The method as defined in claim 1, wherein said particulate arc stabilizing compound in said core includes by weight percent:

| | |
|---|---|
| TiO$_2$ | 70-90% |
| Sodium silicate | 4-15% |
| Potassium silicate | 1-10% |
| Sodium carbonate | 3-16% |
| Colloidal Silica | 2-6% |
| Other components | 0-1%. |

12. The method as defined in claim 1, wherein said step of supplying AC current from a power source includes alternating the current between a positive voltage and a negative voltage, each voltage being greater than 20 volts.

13. The method as defined in claim 1, wherein said step of supplying AC current from said power source includes alternating the polarity of the current less than about 500 amperes.

14. The method as defined in claim 1, wherein said power source is an inverter.

15. The method as defined in claim 14, wherein said inverter outputs an AC waveform based upon a waveform generator controlling a pulse width modulator operated at a frequency of over about 18 kHz.

16. The method as defined in claim 1, wherein said particulate arc stabilizing compound has an average particle size of 50-200 mesh, and further wherein said particulate arc stabilizing compound includes at least 60 weight percent titanium dioxide in said core, said particulate arc stabilizing compound including at least about 1 weight percent colloidal silica in said core, said colloidal silica having an average particle size of 2-25 nm.

17. The method as defined in claim 16, wherein said percentage of said particulate arc stabilizing compound is over about 20% by weight of said core material.

18. The method as defined in claim 17, wherein said percentage of said particulate arc stabilizing compound is up to about 50% by weight of said core material.

19. The method as defined in claim 18, wherein said core material comprises by weight percent:

| | |
|---|---|
| TiO$_2$ | 3-15% |
| Sodium-silico-titanate compound | 15-25% |
| Slag forming Agent | 30-40% |
| Metal Alloying Agent | 35-45%. |

20. The method as defined in claim 18, wherein said core material comprises by weight percent:

| | |
|---|---|
| TiO$_2$ | 20-30% |
| Sodium-silico-titanate compound | 1-5% |
| Slag forming Agent | 20-30% |
| Metal Alloying Agent | 45-55%. |

21. The method as defined in claim 18, wherein said particulate arc stabilizing compound in said core includes by weight percent:

| | |
|---|---|
| TiO$_2$ | 70-90% |
| Sodium silicate | 4-15% |
| Potassium silicate | 1-10% |
| Sodium carbonate | 3-16% |
| Colloidal Silica | 2-6% |
| Other components | 0-1%. |

22. The method as defined in claim 18, wherein said particulate arc stabilizing compound in said core includes by weight percent:

| | |
|---|---|
| TiO$_2$ | 60-90% |
| Sodium silicate | 1-20% |
| Potassium silicate | 1-15% |
| Sodium compound | 1-20% |

-continued

| | |
|---|---|
| Colloidal silica | 1-10% |
| Other compounds | 0-5%. |

23. The method as defined in claim 22, wherein said particulate arc stabilizing compound in said core includes by weight percent:

| | |
|---|---|
| TiO$_2$ | 70-80% |
| Sodium silicate | 3.5-10% |
| Potassium silicate | 1.5-6% |
| Sodium carbonate | 5-15% |
| Colloidal silicate | 2-5% |
| Other compounds | 0-0.5%. |

24. The method as defined in claim 18, wherein said particulate arc stabilizing compound in said core includes by weight percent:

| | |
|---|---|
| TiO$_2$ | 60-90% |
| Sodium silicate | 1-20% |
| Potassium silicate | 1-15% |
| Sodium compound | 1-20% |
| Colloidal silica | 1-10% |
| Other compounds | 0-5%. |

25. The method as defined in claim 24, wherein said particulate arc stabilizing compound in said core includes by weight percent:

| | |
|---|---|
| TiO$_2$ | 70-90% |
| Sodium silicate | 4-15% |
| Potassium silicate | 1-10% |
| Sodium compound | 3-16% |
| Colloidal silica | 2-6% |
| Other compounds | 0-1%. |

26. The method as defined in claim 25, wherein said particulate arc stabilizing compound has a weight ratio of sodium compound to potassium compound of about 1.75-2.5:1, and said colloidal silica in said core constituting about 2-5 weight percent of said particulate arc stabilizing compound.

27. The method as defined in claim 26, wherein said power source is an inverter.

28. The method as defined in claim 27, wherein said inverter outputs an AC waveform based upon a waveform generator controlling a pulse width modulator operated at a frequency of over about 18 kHz.

29. The method as defined in claim 28, wherein said step of supplying AC current from said power source includes alternating the current between a positive voltage and a negative voltage, each voltage being greater than 20 volts.

30. The method as defined in claim 1, wherein said step of supplying AC current from said power source includes alternating the polarity of the current less than about 500 amperes.

31. The method as defined in claim 18, wherein said core material comprises by weight percent:

| | |
|---|---|
| TiO$_2$ | 2-50% |
| Sodium-silico-titanate compound | 1-55% |
| Slag forming Agent | 1-60% |
| Metal Alloying Agent | 0-70%. |

32. The method as defined in claim 31, wherein said particulate arc stabilizing compound in said core includes by weight percent:

| | |
|---|---|
| TiO$_2$ | 70-90% |
| Sodium silicate | 4-15% |
| Potassium silicate | 1-10% |
| Sodium carbonate | 3-16% |
| Colloidal Silica | 2-6% |
| Other components | 0-1%. |

33. The method as defined in claim 31, wherein said particulate arc stabilizing compound has a weight ratio of sodium compound to potassium compound of about 1.75-2.5:1, and said colloidal silica in said core constituting about 2-5 weight percent of said particulate arc stabilizing compound.

34. The method as defined in claim 31, wherein said particulate arc stabilizing compound in said core includes by weight percent:

| | |
|---|---|
| TiO$_2$ | 60-90% |
| Sodium silicate | 1-20% |
| Potassium silicate | 1-15% |
| Sodium compound | 1-20% |
| Colloidal silica | 1-10% |
| Other compounds | 0-5%. |

35. The method as defined in claim 34, wherein said particulate arc stabilizing compound in said core includes by weight percent:

| | |
|---|---|
| TiO$_2$ | 70-80% |
| Sodium silicate | 3.5-10% |
| Potassium silicate | 1.5-6% |
| Sodium carbonate | 5-15% |
| Colloidal silicate | 2-5% |
| Other compounds | 0-0.5%. |

36. The method as defined in claim 31, wherein said core material comprises by weight percent:

| | |
|---|---|
| TiO$_2$ | 3-40% |
| Sodium-silico-titanate compound | 1-55% |
| Slag forming Agent | 20-50% |
| Metal Alloying Agent | 0-55%. |

37. The method as defined in claim 36, wherein said core material comprises by weight percent:

| | |
|---|---|
| TiO$_2$ | 20-40% |
| Sodium-silico-titanate compound | 20-50% |
| Slag forming Agent | 25-45% |
| Metal Alloying Agent | 0-35%. |

38. The method as defined in claim 37, wherein said particulate arc stabilizing compound in said core includes by weight percent:

| | |
|---|---|
| TiO$_2$ | 70-90% |
| Sodium silicate | 4-15% |
| Potassium silicate | 1-10% |
| Sodium compound | 3-16% |
| Colloidal silica | 2-6% |
| Other compounds | 0-1%. |

* * * * *